US005828317A

United States Patent [19]

Togashi

[11] Patent Number: 5,828,317

[45] Date of Patent: *Oct. 27, 1998

[54] REMOTE CONTROL METHOD AND REMOTE CONTROL SYSTEM

[75] Inventor: Kazuyuki Togashi, Iwaki, Japan

[73] Assignee: Alpine Electronics, Inc., Japan

[ * ] Notice: This patent issued on a continued prosecution application filed under 37 CFR 1.53(d), and is subject to the twenty year patent term provisions of 35 U.S.C. 154(a)(2).

[21] Appl. No.: 526,730

[22] Filed: Sep. 11, 1995

[30] Foreign Application Priority Data

Sep. 16, 1994 [JP] Japan .................................... 6-221546

[51] Int. Cl.[6] .......................... G08C 19/00; G08C 19/12; H04B 1/02

[52] U.S. Cl. ........................ 340/825.69; 455/92; 341/176

[58] Field of Search ................. 300/825.69; 340/825.72, 340/825.54, 825.31, 825.34, 825.3; 380/21; 70/256; 455/151.2; 307/10.2, 10.4

[56] References Cited

U.S. PATENT DOCUMENTS 4,596,985 6/1986 Bongard .
4,876,718 10/1989 Citta et al. ................................ 380/42
5,055,701 10/1991 Takeuchi ................................ 307/10.2
5,103,221 4/1992 Memmola .......................... 340/825.31

*Primary Examiner*—Michael Horabik
*Assistant Examiner*—Anthony A. Asongwed
*Attorney, Agent, or Firm*—Brinks Hofer Gilson & Lione

[57] ABSTRACT

A security system including a remote control unit and a vehicle-mounted security apparatus. The remote control unit includes a first cyclic-code generator for generating a first cyclic code in accordance with a predetermined sequence when a key on the remote control unit is depressed. The first cyclic code is added to a command code, which is determined by the depressed key, and is transmitted as a remote control signal. The security apparatus includes a second cyclic code generator which produces a second cyclic code in accordance with the same sequence as used by the first cyclic code generator. When the security apparatus receives the remote control signal from the remote control unit, the security apparatus decodes the first cyclic code from the command code, and compares the first cyclic code with the second cyclic code. If the first and second cyclic codes coincide, the apparatus executes the operation determined by the command code.

20 Claims, 6 Drawing Sheets

REMOTE CONTROL METHOD AND REMOTE CONTROL SYSTEM

BACKGROUND OF THE INVENTION

1. Field of the Invention

The present invention relates to a remote control method and a remote control system, and more particularly, to a remote control method and a remote control system that cannot be accessed unlawfully even if a remote-control signal is intercepted or analyzed.

2. Description of the Prior Art

The vandalism and burglary of vehicles has steadily increased in recent years. To counter this trend, the use of vehicle security systems has steadily increased.

Vehicle security systems typically include a portable controller (remote control unit) and a vehicle-mounted security apparatus. The portable controller is carried by the vehicle driver and transmits coded signals to the security apparatus. The security apparatus is activated or deactivated in response to the coded signals transmitted from the portable controller. In an active security mode, the security apparatus detects attempts to vandalize or burglarize the vehicle, and generates an alarm by, for example, turning the vehicle headlights on and off and sounding an alarm siren. When the security apparatus is in a deactivated mode, the driver can enter and operate the vehicle without the generation of an alarm.

Operation of the security system will now be explained in detail. When the vehicle driver exits the vehicle, the driver closes the vehicle door and depresses a system activation (arming) key on the portable controller. In response, the portable controller transmits a frequency modulated signal including an identification code and an activation control code. The security apparatus receives and demodulates the transmitted signal, compares the identification code with a stored code, and, if the transmitted identification code coincides with the stored code, executes an activation (arming) operation in response to the activation control code and locks the vehicle doors.

In the armed operation state, the security apparatus monitors signals generated by several sensors for abnormal events. The sensors may include one or more of a door open/closed sensor, a vehicle motion sensor, a shock sensor and a glass break sensor. While the vehicle remains undisturbed, the sensors transmit "normal" sensor signals to the security apparatus. If, for example, the vehicle is shaken or moved by a potential vandal or burglar while the vehicle is in the armed state, the motion sensors transmit "abnormal" signals to the security apparatus. Upon receipt of these "abnormal" sensor signals, the security apparatus then transmits alarm signals to the headlights and siren in order to generate an alarm to scare away the potential vandal or burglar.

Upon returning to the vehicle, the driver presses a de-activation (disarming) key on the portable controller. In response, the portable controller transmits a signal including the identification code and a de-activation command code to the security apparatus. The security apparatus demodulates the signals, compares the transmitted identification code with the stored identification code, and, if coincidence occurs, deactivates the sensors and unlocks the doors in response to the de-activation command code.

As described above, the conventional vehicle security system can be controlled by a portable controller to prevent burglary and vandalism of a vehicle.

In the conventional vehicle security system, unauthorized de-activation is prevented by comparing the identification code transmitted with the command code with a stored identification code. That is, each security system has a relatively unique identification code which is transmitted with the command code instructing the arming/disarming of the security apparatus. The security apparatus of each security system only executes an operation in accordance with the transmitted command code when the stored identification code coincides with the transmitted identification code, thereby making unauthorized deactivation of the security apparatus difficult for a potential burglar or vandal who does not possess the correct identification code.

However, a recently developed device allows unauthorized control of a vehicle security system by intercepting and recording the transmission of an original (authorized) signal including an identification code and a disarming command code, and then retransmitting identification codes and command codes at a later time. This device allows a burglar/vandal to disarm a security apparatus by generating an unauthorized disarming command which is interpreted by the security apparatus as being authorized. After disarming the security apparatus, the burglar/vandal can easily vandalize or steal the vehicle.

SUMMARY OF THE INVENTION

Accordingly, an object of the present invention is to provide a remote control method and a remote control system in which copying and retransmission of the remote-control signal cannot disarm a vehicle security system so that burglary and vandalism of the vehicle are prevented.

Another object of the present invention is to provide a remote control method, a remote control system, a remote control unit, and an apparatus to be remote-controlled by the remote control unit, in which the apparatus cannot be remote-controlled by merely copying and transmitting a remote-control signal.

The foregoing objects are achieved by a remote control system according to the present invention including a remote control unit for transmitting a command code that corresponds to a manually activated key and an apparatus for performing an operation that corresponds to the command code transmitted by the remote control unit. Specifically, the foregoing objects can be achieved by a remote control system including a remote control unit having (1) a cyclic-code generator for generating a cyclic code when a key has been operated, (2) a secret code generating portion that modifies the cyclic code transmitted by the cyclic-code generator to generate a secret code, and (3) a transmission portion for transmitting a command code, that corresponds to the activated key, and the secret code; and an apparatus that has (1) a cyclic-code generator for generating cyclic codes in the same sequential order as that of the cyclic-code generator provided for the remote control unit, (2) a cyclic-code reproducing portion for reproducing the cyclic code included in the signal transmitted by the remote control unit, (3) a comparison portion for comparing the cyclic code generated by the cyclic-code generator and the reproduced cyclic code of the remote control unit, and (4) an operation control portion arranged such that, if the cyclic codes coincide with each other, then the operation control portion performs an operation that corresponds to the command code transmitted by the remote control unit, and if the cyclic codes do not coincide with each other, then the operation control portion does not perform the operation that corresponds to the command code.

When a key of the remote control unit is manually activated, the remote control unit generates one cyclic code by the cyclic-code generator thereof, and adds, as the secret code, the cyclic code or a code corresponding to the cyclic code to the command code that corresponds to the operated key before the remote control unit transmits the command code. When the apparatus to be controlled has received the signal from the remote control unit, the apparatus generates one cyclic code by the cyclic-code generator thereof and decodes the cyclic code from the secret code in the received signal to compare the thus-decoded cyclic code of the remote control unit and the cyclic code generated by the apparatus. If the cyclic codes coincide with each other, the apparatus performs the operation that corresponds to the command code transmitted by the remote control unit. If the cyclic codes do not coincide with each other, the apparatus does not perform the operation that corresponds to the command code. The foregoing structure causes the secret code (the cyclic code), to be added to the code, to be changed whenever the command code is transmitted, thereby resulting in that copying of the remote-control signal for use in the previous disarming operation is prevented because the cyclic code of the copied signal does not coincide with the cyclic code of the apparatus. Therefore, even if the copied signal is transmitted, arming cannot be suspended so that the security performance is improved, and unauthorized access into the vehicle, burglary of the vehicle and the like are effectively prevented.

If the cyclic codes do not coincide with each other, the apparatus to be controlled sequentially generates cyclic codes to determine whether or not a subsequently generated cyclic code coincides with the cyclic code of the remote control unit. If a subsequently generated cyclic code coincides with each other before a predetermined number of cyclic codes are generated, the apparatus performs the operation that corresponds to the command code. If the cyclic codes do not coincide with each other though the predetermined number of cyclic codes have been generated, the apparatus does not perform the operation that corresponds to the command code. Thus, even if the key of the remote control unit is (unintentionally) depressed a predetermined number of times in an area in which the apparatus cannot receive electric waves from the remote control unit, operation of the key in the receipt-enabled area enables a predetermined operation, that corresponds to the depressed key, to be performed by the apparatus. Since the cycle of the cyclic codes is tens of thousands (the same cyclic code appears every tens of thousands of times in one cycle), generation of a predetermined number (for example, 100) of cyclic codes does not result in coincide with the cyclic code included in the copied signal.

In one embodiment, the remote control unit performs a mathematical operation including an identification code and the cyclic code generated by the cyclic-code generator to produce the secret code, and adds the secret code and the individual code to the command code when the remote control unit transmits the command code. The apparatus to be controlled causes the identification code thereof to act on the secret code to decode the cyclic code of the remote control unit. If the received identification code and the identification code of the apparatus coincide with each other and as well as the decoded cyclic code and the cyclic code generated by the apparatus coincide with each other, the apparatus performs the operation that corresponds to the command code. Thus, the security performance can further be improved.

Other and further objects, features and advantages of the invention will be appear more fully from the following description.

DESCRIPTION OF THE PREFERRED EMBODIMENTS (a) Overall Structure

Figure 1:
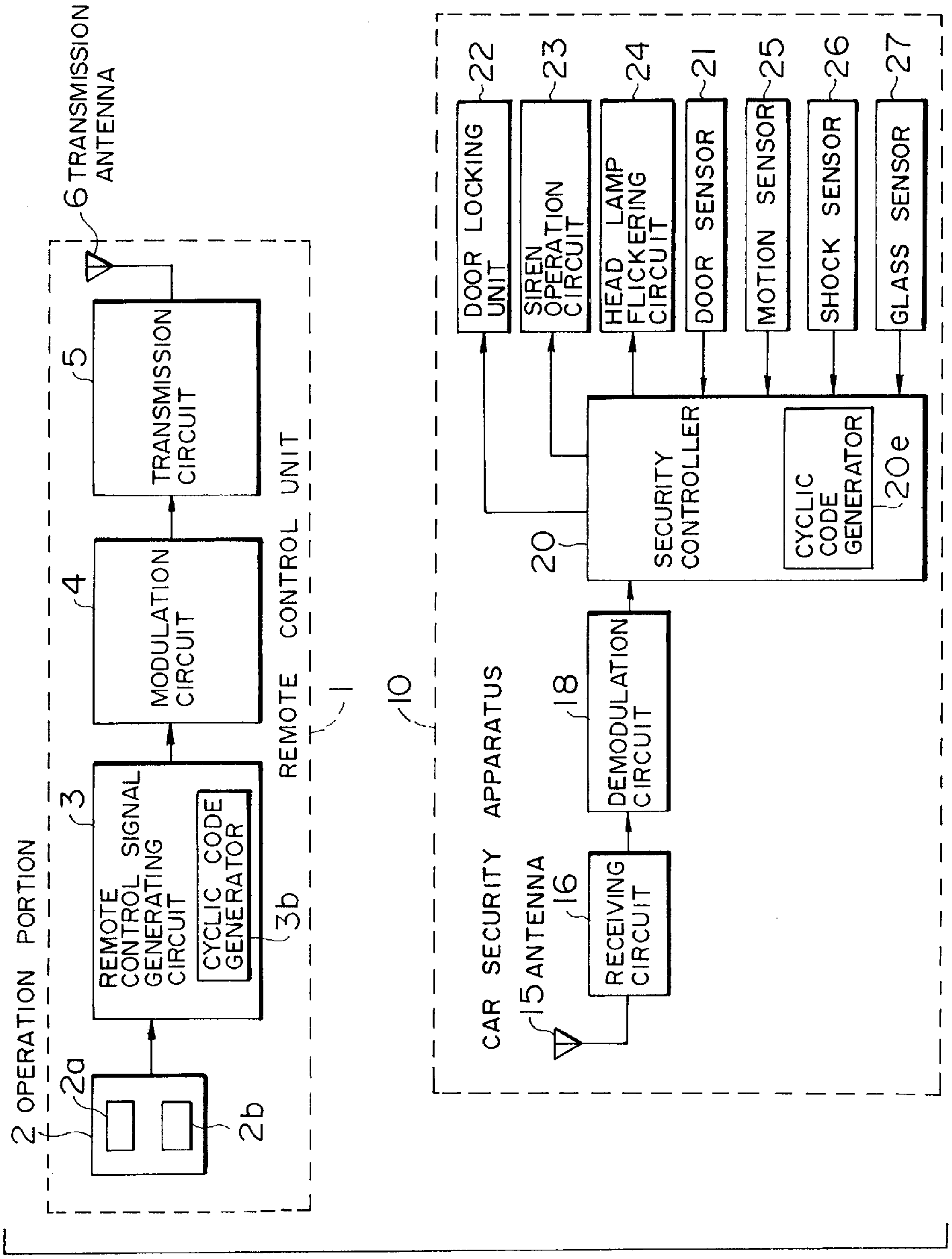
FIG. 1 is a block diagram showing an overall structure of a car security system according to the present invention.

FIG. 1 is a block diagram showing an overall structural view of a vehicle security system according to the present invention. Referring to FIG. 1, the vehicle security system generally includes an operation device (remote control unit) 1 and a security apparatus 10. The security apparatus 10 is mounted on a vehicle, and the remote control unit device 1 is carried by the driver of the vehicle.

The remote control unit 1 includes a keypad (operating portion) 2 having an arming key 2*a* and a disarming key 2*b*. When either of the arming key 2*a* or the disarming key 2*b* are depressed by the driver, the remote control generating circuit 3 produces a digital control signal which is transmitted to a modulation circuit 4. The modulation circuit 4 modulates a carrier wave in response to the digital control signal using, for example, ASK or FSK modulation. Transmission circuit 5 then receives the modulated control signal and converts and amplifies the signal for transmission through an antenna 6.

In accordance with the present invention, the control signal generating circuit 3 includes a cyclic-code generator 3*b* which generates a cyclic code (a code whose value changes in accordance with a predetermined sequential order which is periodically repeated), which is combined with an identification code and a command code before transmission to the modulation circuit 4. Alternatively, the cyclic code generated by the cyclic-code generator 3*b* is modified using the command code and/or the identification code before combination with the identification code and the command code. The cyclic code and the modified cyclic code are commonly referred to herein as a "secret" code because these codes are changed after every transmission. The control signal generating circuit 3 combines the secret code, the identification code and the command code, which is determined by the depressed 1 of the arming key 2*a* and the disarming key 2*b,* to produce a digital control signal which is sent to the modulation circuit 4 and transmission circuit 5. A signal representing the digital control signal is then transmitted through the antenna 6.

The security apparatus 10 includes a receiving antenna 15 for receiving the signal transmitted from the remote controller 1. A receiving circuit 16 converts and amplifies the received signal, and a demodulating circuit 18 demodulates the converted/amplified signal to produce a received digital control signal which is substantially identical to the transmission digital control signal. The received digital control signal is transmitted to security controller 20 for processing.

The security controller 20 is a microprocessor including circuitry for processing the digital control signal. The security controller 20 also includes circuitry for receiving and processing signals from a door sensor 21, a motion sensor 25, a shock sensor 26 and a glass sensor 27. In addition, the security controller 20 includes circuitry for generating control signals which are transmitted to a door locking unit 22, a siren operation circuit 23 and a headlamp flickering circuit 24.

In accordance with the present invention, the security controller 20 includes a cyclic-code generator 20*e* which generates a cyclic code (which corresponds to the cyclic code generated by the cyclic-code generator 3*b*) each time a digital control signal is received from the remote control unit 1. Furthermore, the security controller 20 includes circuitry for separating (decoding) the cyclic code from the received digital command signal and for comparing the decoded cyclic code with the cyclic code generated by the cyclic code generator 20*e*. If the two cyclic codes coincide with each other, the security controller 20 performs a control operation which is consistent with the command code generated by the remote control unit 1. If the two cyclic codes do not coincide with each other, the security controller 20 does not perform the control operation specified by the command code.

When the arming key 2*a* of the remote control unit 1 is depressed by the driver, the security controller 20 locks the vehicle doors and initiates a security operation. During the security operation, if an unauthorized person (such as a burglar or vandal) opens the door or causes the vehicle to move in an attempt to steal or vandalize the vehicle, the security controller 20 detects the foregoing operation by means of the door sensor 21, the motion sensor 25, the shock sensor 26, or the glass sensor 27, and transmits signals to the siren operation unit 23 and/or the head lamp flickering circuit 24 to sound an alarm or flicker headlights to scare away the burglar and to alert the driver or the police.

(b) Remote Control Unit

Figure 2:
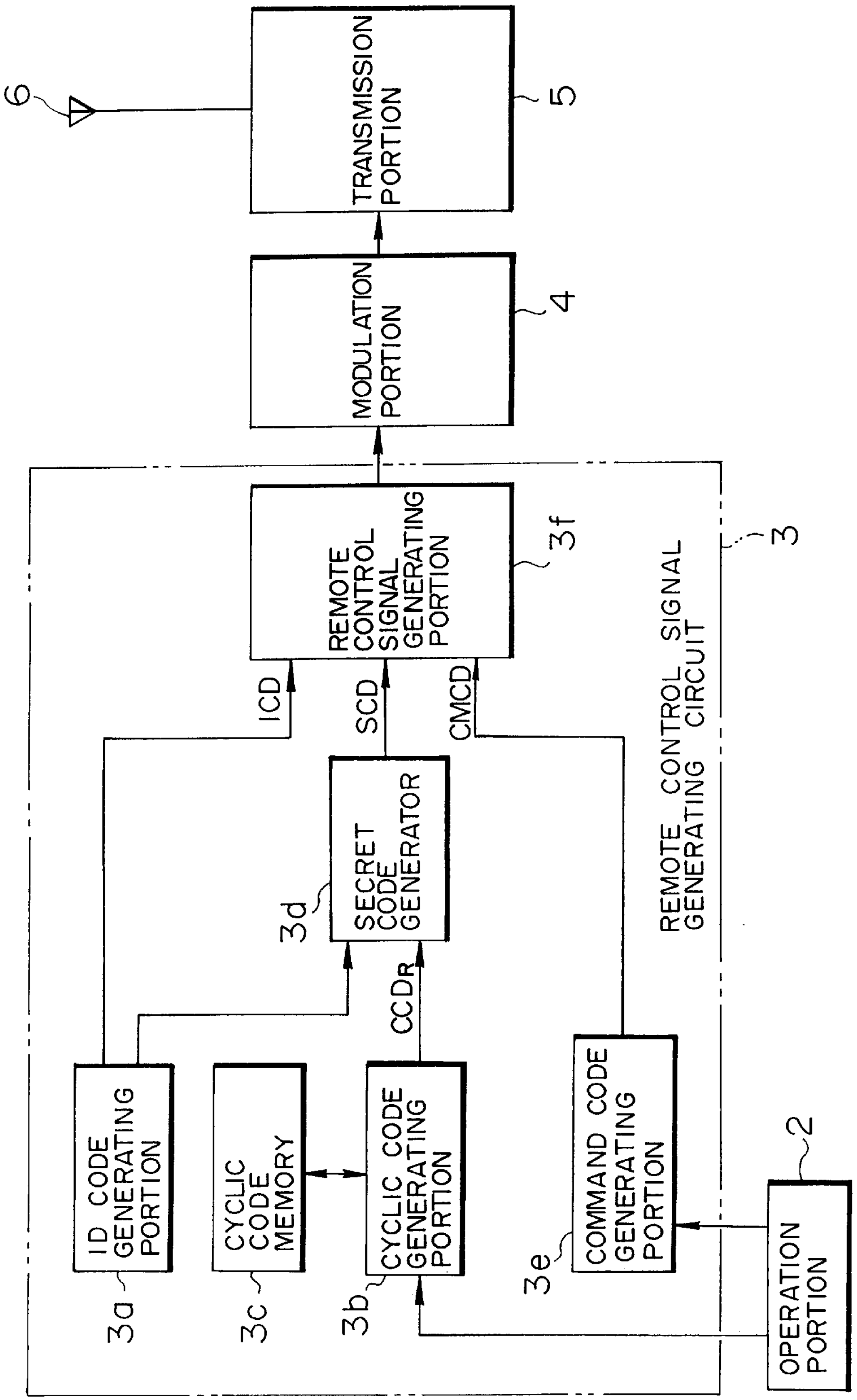
FIG. 2 is block diagram showing a remote control unit of the car security system.

FIG. 2 is a block diagram of the remote control unit 1, in which the same elements as those shown in FIG. 1 are given the same reference numerals. The remote-control signal generating circuit 3 includes an identification-code generating portion 3*a* which stores a plurality of identification codes in a ROM and arbitrarily generates one of the identification codes each time a key is pressed. The signal generating circuit 3 also includes a cyclic-code generating portion 3*b* for generating one cyclic code each time one of the arm key 2*a* or disarm key 2*b* have been depressed, a cyclic-code memory 3*c* for storing a previously generated cyclic code, a calculator 3*d* for generating a secret code SCD by performing a predetermined calculation using the cyclic code and the identification code, a command-code generating portion 3*e* for generating a command code CMCD that corresponds to the operated key (that is, the arming key 2*a* and the disarming key 2*b*), and a remote-control signal generating circuit 3*f* for generating a digital remote-control signal (one frame) formed by adding the identification code and the secret code to the command code so as to transmit the generated remote-control signal to the modulation portion 4.

Figure 3:
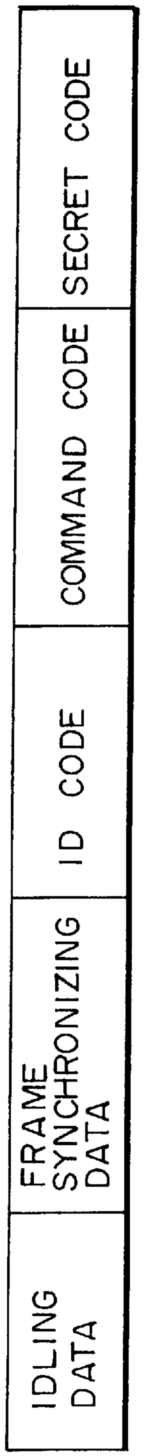
FIG. 3 is a diagram showing one frame of a remote control data signal.

FIG. 3 is a diagram showing the contents of one frame of the remote-control signal generated by the remote control unit 1. Each frame consists of idling data, frame synchronizing data, the identification code, the command code, and the secret code. The idling data is received by the security controller 20 of the security apparatus 10, and causes the security controller 20 to change from a "sleep" mode to a high-speed operation mode for processing the identification code, the command code and the secret code.

(c) Cyclic Code Generator

Figure 4:
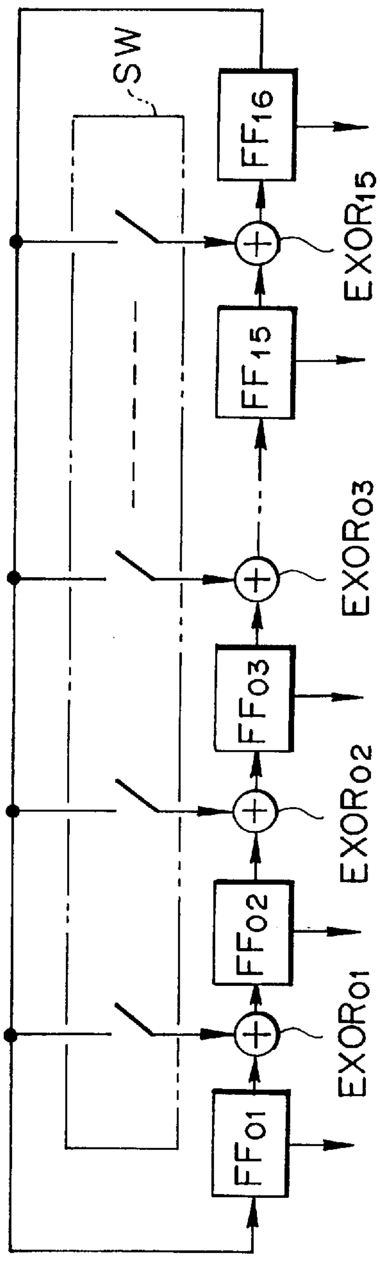
FIG. 4 is a simplified diagram showing the structure of a cyclic-code generator.

FIG. 4 is a diagram showing the structure of the cyclic-code generator 3*b* that includes n (in this example, n=16) flip-flops $FF_{01}$ *to* $FF_{16}$, n-1 exclusive OR circuits $EXOR_{01}$ to $EXOR_{15}$, and switch portion SW for applying the output from a final flip-flop $FF_{16}$ to a predetermined EXOR among $EXOR_{01}$ to $EXOR_{15}$. By selecting the exclusive OR circuit that receives the output from the flip-flop $FF_{16}$, the state of the generated cyclic code can be changed, thereby greatly increasing the number of possible code variations associated with the cycle.

The cyclic-code generator 3*b* advances the contents of the flip flops $FF_{01}$ to $FF_{16}$ (the cyclic code) by one in response to a predetermined trigger signal, for example, a key operation signal, so as to transmit a predetermined cyclic code from each of the flip-flops $FF_{01}$ to $FF_{16}$. Because the cyclic code bit from flip flop $FF_{16}$ is selectively applied to one or more of the exclusive OR gates $EXOR_{01}$ through $EXOR_{15}$, a pattern of sequential cyclic-codes may not be repeated for over 10,000 operations.

Figure 5:
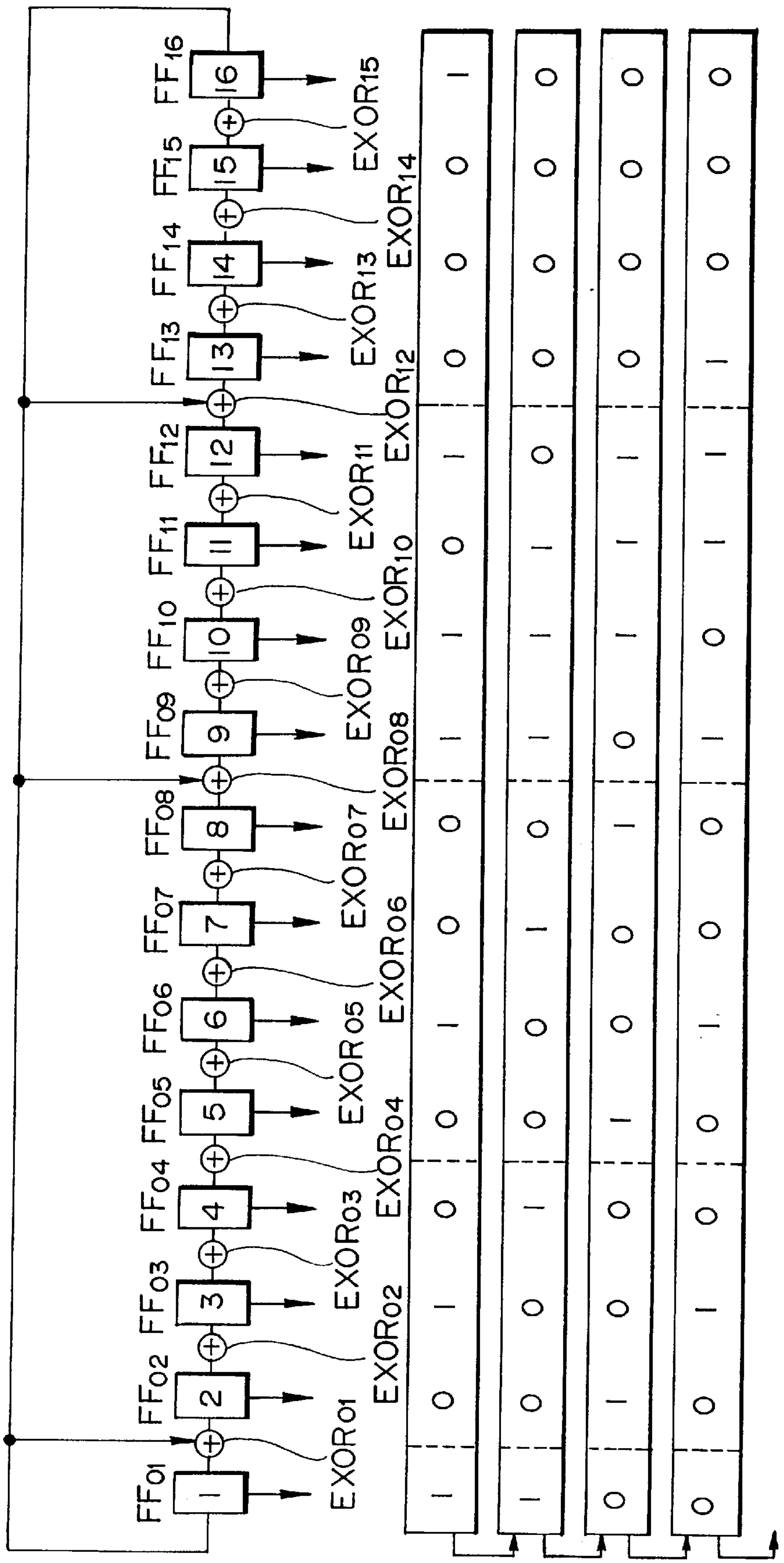
FIG. 5 is a block diagram showing the structure of a cyclic-code generator in accordance with the present invention.

FIG. 5 is a diagram showing the structure of the cyclic-code generator according to one possible embodiment of the present invention, in which the output from the final flip-flop $FF_{16}$ is returned to the exclusive OR circuits $EXOR_{01}$, $EXOR_{08}$ and $EXOR_{12}$ and to flip flop $FF_{01}$. In this embodiment, if a key operation signal is generated when the respective contents of the flip flops $FF_{01}$ to $FF_{16}$ of the cyclic-code generator are:

1010 0100 1101 0001 then the cyclic-code generator shifts the respective contents of the flip flops in response to the returned bit from flip flop $FF_{16}$ to 1001 0010 1110 0000

The thus-changed contents are then transmitted to the calculator 3*d* (FIG. 2) as a cyclic code $CCD_R$. Then, the cyclic-code generator shifts the contents thereof whenever a key operation signal is generated so that transmission of one cyclic code is performed sequentially.

(d) Structure of Security Controller

Figure 6:
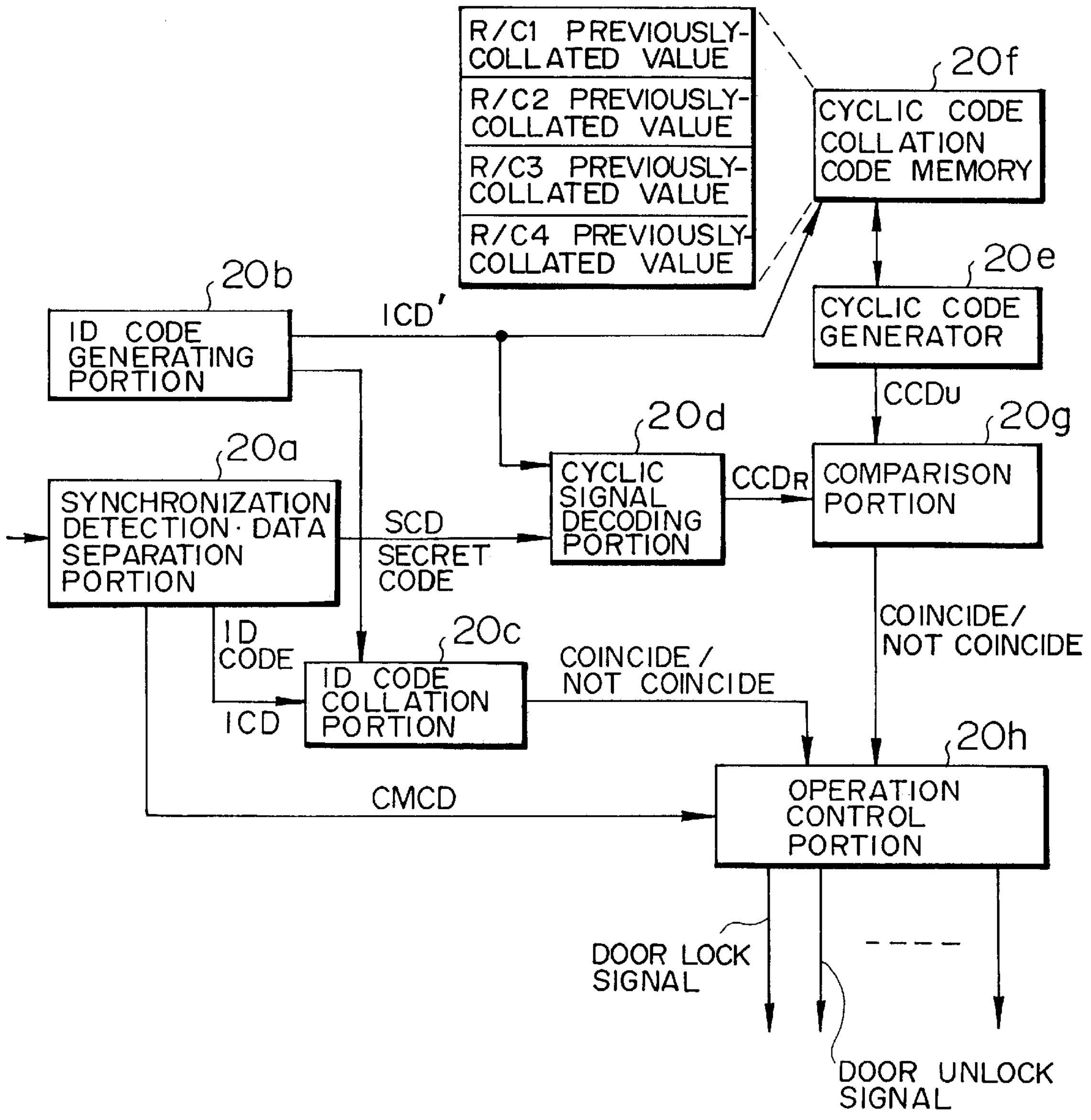
FIG. 6 is a diagram showing the structure of a security controller of the car security system.

FIG. 6 is a diagram showing the structure of the security controller 20 of the security apparatus 10. Referring to FIG. 6, the security controller 20 includes a synchronization detection and data separation portion 20*a* for receiving a demodulated signal transmitted from the demodulating circuit 18 (see FIG. 1) to detect synchronization of the received signal and to separate the respective codes (the command code CMCD, the identification code ICD and the secret code SCD) from one another. The security controller 20 also includes an individual-code generating portion 20*b* in which a plurality of identification codes are registered which correspond to the identification codes transmitted from the remote control unit 1 and which arbitrarily transmits a predetermined identification code ICD', the identification-code generating portion 20*b* having a ROM for storing the individual codes. Further, an identification-code collating portion 20*c* is provided for determining whether or not the identification code transmitted from the remote control unit 1 coincides with any of the identification codes stored in ROM of the identification-code generation portion 20*b*. In applications in which the secret code is formed in the remote control unit 1 by modifying the cyclic code using the identification code, a cyclic-code decoding portion 20*d* is provided for separating the identification code from the secret code supplied from the remote control unit so as to decode the cyclic code.

A cyclic-code generator 20*e* is also provided which has the same structure as that of the cyclic-code generator 3*b* (see FIG. 5) of the remote control unit 1 so as to generate a cyclic code in the same sequential order as that of the cyclic-code generator 3*b* of the remote control unit 1. A cyclic-code collation code memory 20*f* is provided for storing the latest cyclic code transmitted by the cyclic-code generator 20*e* so as to collate the same to correspond to each individual code. A comparison portion 20*g* is provided for collating the received cyclic code $CCD_R$ from the remote control unit 1 and transmitted by the cyclic-code decoding portion 20*d,* with the generated cyclic code $CCD_U$ transmitted by the cyclic-code generator 20*e*. Finally, an operation control portion 20*h* is provided for performing an operation corresponding to the command code transmitted by the remote control unit 1 if the identification codes ICD and ICD' coincide with each other and the cyclic codes $CCD_R$ and $CCD_U$ coincide with each other.

(e) Overall Operation

When a predetermined operation key (for example, the disarming key 2*b*) of the remote control unit 1 is depressed by the driver, the cyclic-code generating portion 3*b* reads, from the cyclic-code memory 3*c,* a latest (first) cyclic code, and sets each of the flip-flops $FF_{01}$ to $FF_{16}$ (see FIG. 5) to correspond with the latest cyclic code. Then, the cyclic-code generator 3*b* advances the contents of the cyclic-code generating portion 3*b* by one cycle to generate a new (second) cyclic code, and transmits the new cyclic code $CCD_R$ to the secret code generator (calculator) $3_d$. The cyclic-code generator 3*b* also transmits the new cyclic code for storage as the latest cyclic code in the cyclic-code memory 3*c*. The secret code generator 3*d* uses the cyclic code $CCD_R$ and a predetermined identification code to perform a predetermined calculation (such as addition) so as to generate secret code SCD. Then, the remote-control signal generating portion 3*f* adds the individual code ICD and the secret code SCD to the command code (e.g., disarming code) CMCD which is transmitted by the command-code generating portion 3*e* and corresponding to the operated key to produce a digital remote-control signal having the frame structure shown in FIG. 3. The modulation portion 4 then modulates the carrier wave in response to the digital remote-control signal and as well as converts the frequency, while the transmission portion 5 amplifies the electric power to transmit the remote-control signal through the antenna 6.

The thus transmitted remote-control signal is received by the antenna of the security apparatus 10. The receiving circuit 16 of the security apparatus 10 then subjects the transmitted signal to high-frequency processing, such as a high frequency amplification process and a frequency conversion process. The demodulating circuit 18 then demodulates the transmitted digital remote-control data from the transmitted signal and supplies the digital remote-control data to the security controller 20.

In the security controller 20, the synchronization detection and data separation portion 20*a* (see FIG. 6) detects synchronization in accordance with synchronization data included in the digital remote-control data so as to separate the command code (the disarming code) CMDC, the individual code ICD and the secret code SCD from one another, and transmits the separated codes respectively to the operation control portion 20*h,* the ID collation portion 20*c* and the cyclic signal decoding portion 20*d.*

The identification-code collating portion 20*c* determines whether or not the received identification code ICD coincides with one of the authorized codes ICD' previously registered into the ROM (not shown) of the identification-code generation portion 20*b,* and notifies the operation control portion 20*h* regarding the results of the comparison. If the codes ICD and ICD' coincide with each other, the identification-code collating portion 20*c* stores a stored cyclic code CCDU corresponding to the identification code ICD' into the memory corresponding to the individual code.

The cyclic-code decoding portion 20*d* causes the stored identification code ICD' transmitted from the individual-code generating portion 20*b* to act on the received secret code SCD to perform a predetermined calculation so as to decode the received cyclic code $CCD_R$. On the other hand, the cyclic code collation code memory 20*f* transmits the last (third) cyclic code associated with the identification code ICD' to the cyclic-code generator 20*e*. The cyclic-code generator 20*e* reads the latest collated cyclic code (the cyclic code used for the previous collation) stored in the cyclic-code collation memory 20*f* resets the flip-flops $FF_{01}$ to $FF_{16}$ to correspond with the last cyclic code. Then, the cyclic-code generator 20*e* shifts the contents of the flip-flops $FF_{01}$ to $FF_{16}$ to generate next (fourth) cyclic code $CCD_U$ and supplies the next cyclic code $CCD_U$ to the comparison portion 20*g*.

The comparison portion 20*g* compares the decoded (second) cyclic code $CCD_R$ of the remote control unit 1 and the (fourth) cyclic code $CCD_U$ transmitted from the cyclic-code generator 20*e,* and transmits a signal to the operation control portion 20*h* indicating whether or not they coincide with each other.

If the identification codes ICD and ICD' coincide with each other and the cyclic codes $CCD_R$ and $CCD_U$ coincide with each other, the operation control portion 20*h* recognizes that the received signal is a valid remote control signal. The operation control portion 20*h* then receives the command code (in this example, the disarming code) CMCD and stores it to the memory 20*f* that corresponds to the identification code, suspends the security operation of the security apparatus 10 in accordance with the foregoing identification code, that is, the disarming code, and then transmits a door unlock signal.

If the identification codes ICD and ICD' do not coincide with each other, or if the cyclic codes $CCD_R$ and $CCD_U$ do not coincide with each other, the operation control portion 20*h* recognizes that the subject operation is unauthorized, and the operation control portion 20*h* inhibits the operation corresponding to the command code CMCD. That is, the operation control portion 20*h* does not suspend the security operation, does not unlock the door and does not rewrite the contents of the memory 20*f.*

Since the foregoing arrangement causes the secret code (the cyclic code) added to the command code to be changed whenever the command code is transmitted by the key operation, it is not possible for the cyclic code to be copied and used in an attempt to gain unauthorized access to the vehicle. That is, because the cyclic code changes after each transmission, copying a transmitted cyclic code will not allow access to the vehicle because the copied cyclic code will not coincide with an updated cyclic code stored in the security apparatus 10. Therefore, simple retransmission of a copied signal cannot suspend arming so that the security performance of the security system is improved, and invasion and burglary of the vehicle are effectively prevented.

Since the remote control unit 1 causes the individual code to act on (add to) the cyclic code generated by the cyclic code generator 3*b* to produce the secret code SCD so as to transmit the command code to which the secret code and the individual code have been added, the security performance can further be improved.

(f) Modifications (f-1) First Modification

There is a possibility that a user erroneously (unintentionally) depresses the key of the remote control unit 1 in an area (out of a receipt-enabled area) in which the security apparatus 10 cannot receive electric waves from the remote control unit 1. In the foregoing case, the cyclic code of the remote control unit 1 undesirably advances as compared with the cyclic code of the security apparatus by a degree corresponding to the unintentional depression, thus resulting in that the cyclic codes of the remote control unit and the security apparatus do not coincide with each other.

Accordingly, even if the key is (unintentionally) depressed a predetermined number of times (for example, 100 times or less), a valid operation of the remote control unit in a receipt-enabled area must cause the cyclic codes to coincide with each other so as to perform an instructed operation.

Figure 7:
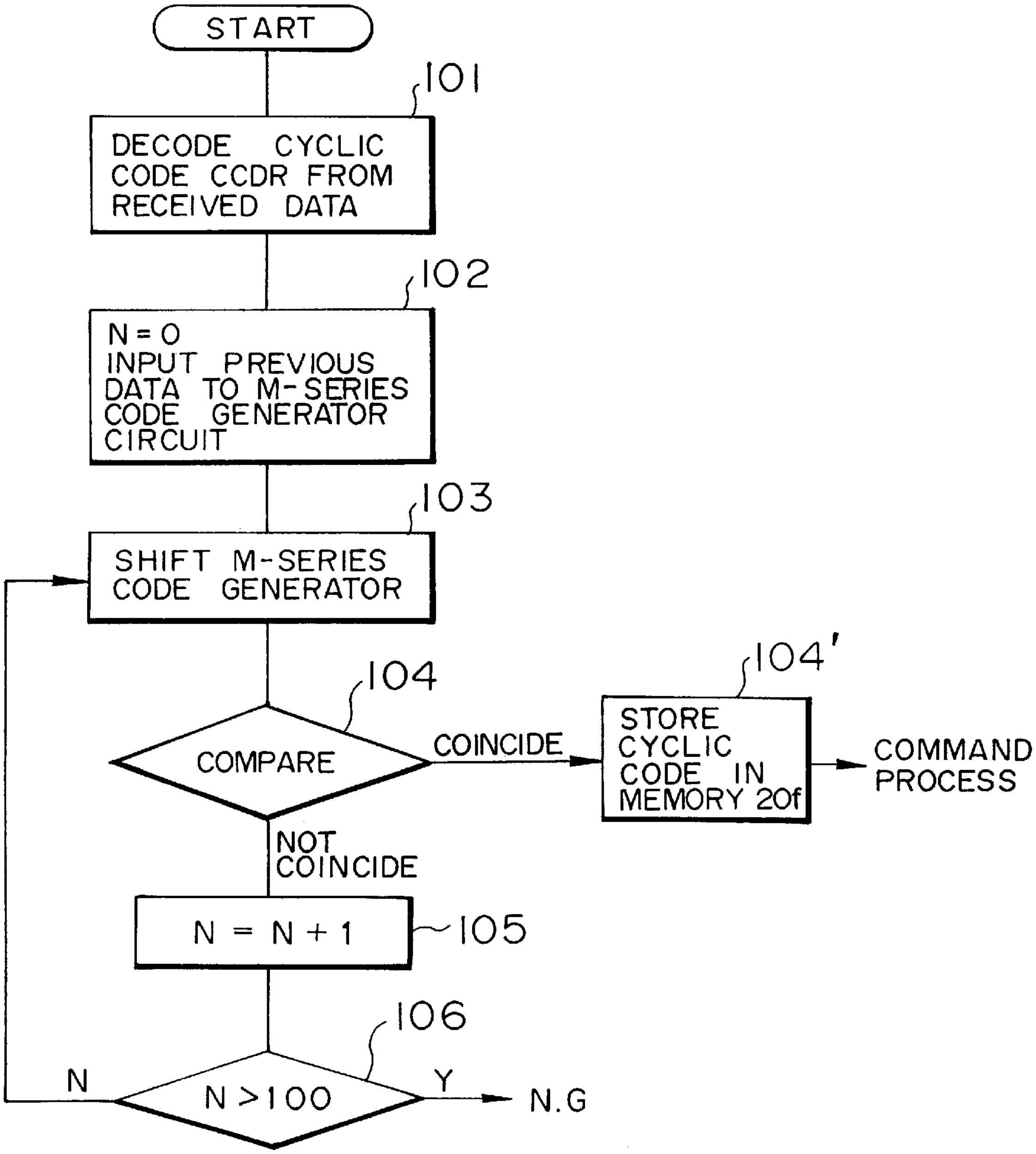
FIG. 7 is a flow chart of the operation of the security controller shown in FIG. 6.

FIG. 7 is a flow chart of the operation of the security controller 20 to be performed in the foregoing case. The security controller 20 receives remote-control data from the remote control unit 1 and decodes the cyclic code $CCD_R$ from the received remote-control data (step 101). Then, the previous collated cyclic code is read from the memory **20*f* and set into the cyclic code generator 20*e* and a variable N is initialized to zero (step 102). Then, the cyclic code generator 20*e* shifts the contents thereof to sequentially generate cyclic codes $CCD_U$ (step 103) and compares the cyclic codes $CCD_U$ with the decoded cyclic code $CCD_R$ of the remote control unit (step 104**).

If one of the cyclic codes $CCD_U$ coincides with the decoded cyclic code $CCD_R$, the cyclic code $CCD_U$ is stored in the memory **20*f* (step 104'), and this coincidence is transmitted to the operation control portion 20*h*. Thus, the comparison operation is completed. If they do not coincide with each other, N is advanced ($N+1 \rightarrow N$, step 105) by one. Then, whether or not N has exceeded a predetermined value, for example, 100, is determined (step 106). If N has exceeded 100, a determination is made that an unauthorized use of the remote control has been performed, and thus the comparison process is terminated. If $N \leqq 100$, the operation returns to step 103** so that the ensuing process is repeated.

As a result, if a key of the remote control unit 1 is (unintentionally) depressed by a predetermined times (=100 times) or fewer in an area outside the receipt-enabled area for the security apparatus 10, key operation in the receipt-enabled area enables a predetermined operation corresponding to the operated key to be performed. Since the cycle of the cyclic codes includes tens of thousands of values before repeating in the foregoing case, a predetermined number (for example, 100) of generated cyclic codes does not produce coincidence. Therefore, it is not possible for a cyclic code included in a copied signal transmitted by an unauthorized outsider to de-activate the security apparatus.

(f-2) Second Modification

Although the foregoing structures have an arrangement that identification code is added to the cyclic code in such a manner that bits correspond to one another to produce a secret code, and the secret code is added to the command code when the command code is transmitted by the remote control unit, the cyclic code may be used (unmodified) as the secret code.

Although the structure has been described in which the individual code is added to the cyclic code in such a manner that the bits correspond to one another to produce the secret code, the method of production is not limited to addition. The secret code may be produced by another calculation method, such as subtraction. If a possibility arises that the remote-control signal is unlawfully copied in order to be analyzed, the method of producing the secret code may be further complicated. This further complicates the task of a potential burglar to gain unauthorized access to the vehicle by transmitting a valid disarming command signal.

(f-3) Third Modification

Although the remote-control signal is, in the foregoing embodiments, produced by adding the identification code and the secret code to the command code, and the remote-control signal is transmitted by the remote control unit, the necessity of transmitting the identification code can be eliminated where only one authorized remote control unit 1 is used in the security system. However, where two or more remote control units are authorized to access one security apparatus, identification codes are necessary to identify the proper cyclic code.

(f-4) Fourth Modification

Although the security apparatus is able to correspond to a plurality of remote control units in the foregoing embodiments, a structure may be employed in which the security apparatus is able to correspond to only one remote control unit.

Although the case where the security apparatus mounted on a vehicle is remote-controlled by the remote control unit has been described, the present invention is not limited to the described security system. The structure of the present invention may be adapted to any of a variety of remote control systems, such as a system in which the doors of a vehicle are opened/closed by a remote-control method or a system in which doors of a home are opened/closed by a remote-control method.

In the foregoing embodiments, the position at which the secret code SCD is disposed in the frame is not limited. If the secret code SCD is disposed at the trailing end of the frame, a remote control unit adapted to the cyclic code is able to control a security apparatus that is not adapted to the cyclic code, whereby the system can be used conveniently. Therefore, the secret code SCD is disposed at the trailing end of the frame.

Although the invention has been described in its preferred form, it is understood that the present disclosure of the preferred form can be changed in the details of construction and the combination and arrangement of parts may be resorted to without departing from the spirit and the scope of the invention as hereinafter claimed.

As described above, according to the present invention, whenever the command code is transmitted, the secret code (the cyclic code) is changed so that, even if the remote-control signal used in the previous operation is copied, the cyclic code of the copy signal does not coincide with the cyclic code to be transmitted in response to the next key operation. Therefore, only the transmission of the copy signal cannot suspend arming, and, thus, the security performance can be improved. Thus, unauthorized access into the vehicle and burglary of the vehicle can effectively be prevented.

Furthermore, according to the present invention, if the received cyclic code of the remote control unit and the stored cyclic code of the apparatus do not coincide with each other, the stored cyclic code of the apparatus can be advanced to a predetermined number of times. As a result, if a key of the remote control unit is (unintentionally) depressed a predetermined number of times in an area outside the receipt-enabled area for the apparatus, and thus the cyclic code of the remote control unit becomes out of sequence with respect to the cyclic code of the apparatus, the cyclic code of the apparatus can be corrected to coincide with that of the remote control unit if the key is depressed in the receipt-enabled area. Thus, an instructed remote control can be performed. Since the cycle of the cyclic codes is in the tens of thousands of operations, generation of cyclic codes by a predetermined number of times (for example, 100 times) does not result in coincidence with a cyclic code included in a remote-control signal (a copy signal) transmitted by an unauthorized outsider. As a result, unauthorized access to and burglary of a vehicle can be prevented.

In addition, according to the present invention, the remote control unit causes the individual code to act on the cyclic code generated by the cyclic code generator so as to produce the secret code. Therefore, the security performance can be improved.

What is claimed is:

1. A method for controlling a remote control system, the remote control system including:

a remote control unit having a key and transmission circuitry for transmitting a remote-control signal in response to actuation of the key, the remote-control signal including a command code; and a stationary apparatus for receiving the remote-control signal and for performing an operation that corresponds to the command code transmitted by said remote control unit;

wherein each of the remote control unit and the stationary apparatus include a cyclic code generator, each cyclic code generator generating incremental cyclic codes in a common sequential order;

the method comprising the step of:

incrementing the cyclic code generator of the remote control unit such that a first cyclic code changes to a second cyclic code each time the key is actuated, the first and second cyclic codes being represented by a plurality of sequential bits including a last bit, the second cyclic code being generated by incrementally shifting a first group of the sequential bits and by exclusive-ORing the last bit with a second group of sequential bits;

transmitting the second cyclic code with the command code in the transmitted remote-control signal;

incrementing the cyclic code generator of the stationary apparatus such that a third cyclic code changes to a fourth cyclic code upon receiving the transmitted remote-control signal;

comparing the second cyclic code with the fourth cyclic code; and executing the operation in response to the command code only when the second cyclic code coincides with the fourth cyclic code.

2. A remote control method according to claim 1, wherein the stationary apparatus is a security apparatus.

3. A remote control method according to claim 1, wherein the step of comparing the second cyclic code with the fourth cyclic code further comprises the steps of:

(a) when the second cyclic code differs from the fourth cyclic code, incrementing the cyclic code generator of the security apparatus such that the fourth cyclic code is changed to a next sequential cyclic code;

(b) comparing the changed fourth cyclic code with the second code; and (c) repeating steps (a) and (b) until one of (i) the second cyclic code coincides with the fourth cyclic code, and (ii) the fourth cyclic code is changed a predetermined number of times.

4. A remote control method according to claim 1, wherein an identification code is stored in both the remote control unit and the security apparatus, and the method further comprises:

modifying the second cyclic code using the identification code prior to transmission of the remote-control signal, and decoding the modified second cyclic code received by the security apparatus to separate the identification code from the second cyclic code prior to the step of comparing the second cyclic code with the fourth cyclic code.

5. A remote control method according to claim 1, wherein an identification code is stored in both the remote control unit and the security apparatus, and the method further comprises:

modifying the second cyclic code using the identification code prior to transmission of the remote-control signal, and adding said modified second cyclic code and said identification code to said command code prior to transmission of the remote control signal;

subtracting the command code from the remote control signal received by the security apparatus to separate the modified second cyclic code from the command code;

decoding the second cyclic code from the modified second cyclic code prior to the step of comparing the second cyclic code with the fourth cyclic code; and if the received identification code coincides with an identification code stored by the security apparatus, and the second cyclic code coincides with the fourth cyclic code, then performing the step of executing the operation.

6. A remote control system comprising:

a remote control unit including:

a key, transmission circuitry for transmitting a remote-control signal including a command code in response to actuation of the key, a first cyclic code generator for generating incremental cyclic codes in a predetermined order such that a first cyclic code changes to a second cyclic code each time the key is actuated, the first and second cyclic codes being represented by a plurality of sequential bits including a last bit, the second cyclic code being generated by incrementally shifting a first group of the sequential bits of the first cyclic code, and by exclusive-ORing the last bit with a second group of the sequential bits of the first cyclic code, and transmission circuitry for transmitting the remote-control signal, the remote control signal including the second cyclic code and the command code; and an apparatus for receiving the remote-control signal and for performing an operation that corresponds to the command code transmitted by the remote control unit, the apparatus including:

a second cyclic code generator for generating incremental cyclic codes in the predetermined order such that a third cyclic code changes to a fourth cyclic code upon receiving the transmitted remote-control signal, means for comparing the second cyclic code with the fourth cyclic code and for generating a coincidence signal only when the second cyclic code coincides with the fourth cyclic code, and an operation control circuit for executing an operation in response to the command code upon generation of a coincidence signal by the means for comparing.

7. A remote control system according to claim 6, wherein the apparatus is a security apparatus mounted on a vehicle and the remote control unit is carried by a driver of the vehicle, and the remote-control signal is transmitted as a modulated radio signal.

8. A remote control system according to claim 6, wherein the means for comparing the second cyclic code with the fourth cyclic code further comprises:

means for incrementing the cyclic code generator of the security apparatus such that the fourth cyclic code is changed to a next sequential cyclic code when the second cyclic code differs from the fourth cyclic code; and means for comparing the changed fourth cyclic code with the second code;

wherein the cyclic code is repeatedly incremented until one of (i) the second cyclic code coincides with the fourth cyclic code, and (ii) the fourth cyclic code is changed a predetermined number of times.

9. A remote control system according to claim 6, wherein the remote control unit includes a memory for storing an identification code, wherein the remote control unit includes means for modifying the second cyclic code using the identification code to produce a modified second cyclic code prior to transmission of the remote-control signal, and wherein the security apparatus includes means for decoding the modified second cyclic code to separate the identification code from the second cyclic code prior to the step of comparing the second cyclic code with the fourth cyclic code.

10. A remote control system according to claim 6, wherein the remote control unit includes means for storing an identification code, wherein the remote control unit includes means for modifying the second cyclic code using the identification code to produce a modified second cyclic code, and wherein the remote control unit includes means for adding the modified second cyclic code and the identification code to the command code prior to transmission of the remote control signal, wherein the security apparatus includes means for subtracting the command code from the remote control signal to separate the modified second cyclic code from the command code, and wherein the security apparatus includes means for decoding the second cyclic code from the modified second cyclic code prior to comparing the second cyclic code with the fourth cyclic code.

11. A remote control unit for transmitting a command code in response to manual actuation of an operation key so as to control a remote-control apparatus, the remote control unit comprising:

a cyclic-code generator for generating (a first) cyclic code when the operation key has been actuated, the cyclic code being represented by a plurality of sequential bits including a last bit, the cyclic code being generated by incrementally shifting a first group of the sequential bits, and by exclusive-ORing the last bit with a second group of sequential bits;

a secret code generating portion for modifying the cyclic code generated by the cyclic-code generator to generate a secret code;

a remote-control signal generating portion for generating a remote-control signal including the command code and the secret code; and a remote-control signal transmission portion for transmitting the remote-control signal.

12. A remote control unit according to claim 11, wherein the remote control unit is a remote control unit associated with a security system.

13. A remote control unit according to claim 11, wherein the remote control unit includes a memory for storing an identification code, and the secret code generating portion includes means for modifying the cyclic code by performing a mathematical operation including the cyclic code and the identification code to produce the secret code.

14. A remote control unit according to claim 11, wherein the remote control unit includes a memory for storing an identification code, the secret code generating portion includes means for modifying the cyclic code by performing a mathematical operation including the cyclic code and the identification code to produce the secret code, and the remote-control signal generating portion includes means for adding the secret code and the identification code to the command code.

15. An apparatus for receiving a remote-control signal including a cyclic code and a command code from a remote control unit, the apparatus comprising:

a cyclic-code generator for generating cyclic codes in a predetermined sequential order, the cyclic code being represented by a plurality of sequential bits including a last bit, the cyclic code being generated by incrementally shifting a first group of the sequential bits, and by exclusive-ORing the last bit with a second group of sequential bits;

a cyclic code reproducing portion for reproducing the cyclic code included in the received remote-control signal from the remote control unit;

a comparison portion for comparing the cyclic code generated by the cyclic-code generator and the cyclic code of the remote-control signal and for generating one of a coincidence signal and a non-coincidence signal, and an operation control portion including means for performing an operation that corresponds to the command code transmitted by the remote control unit only upon generation of a coincidence signal by the comparison portion.

16. An apparatus according to claim 15, wherein the apparatus is a security apparatus of a security system.

17. An apparatus according to claim 15, wherein, if a non-coincidence signal is generated by the comparison portion, the cyclic-code generator sequentially generates a plurality of updated cyclic codes, the comparison portion compares each updated cyclic code with the cyclic code of the remote control unit, and the operation control portion performs the operation corresponding to the command code only if one of the updated cyclic codes coincides with the cyclic code of the remote control unit before a predetermined number of updated cyclic codes are generated.

18. An apparatus to be remote-controlled by a remote control unit according to claim 15, wherein the apparatus includes memory for storing an identification code, and includes means for performing a mathematical operation involving the identification code and the cyclic code of the remote control unit.

19. An apparatus according to claim 15, wherein the apparatus includes memory for storing an identification code, and means for performing a mathematical operation including the identification code and the cyclic code of the remote control unit, wherein the operation control portion only performs an operation corresponding to the command code if a received identification code and the stored identification code thereof coincide with each other and as well as the decoded cyclic code and the cyclic code generated by the apparatus coincide with each other.

20. The apparatus according to claim 15, wherein the cyclic-code generator comprises a plurality of sequentially-arranged flip flops including a first flip flop and a last flip flop, the output of each flip flop other than the last flip flop being applied to next-sequential flip flop through an exclusive OR gate, the output of the last flip flop being applied to the first flip flop and at least one of the exclusive OR gates.

* * * * *